Dec. 21, 1954   O. H. SCHUCK ET AL   2,697,822
SOUND DETECTING AND INDICATING SYSTEM
Filed Aug. 14, 1944   3 Sheets-Sheet 1
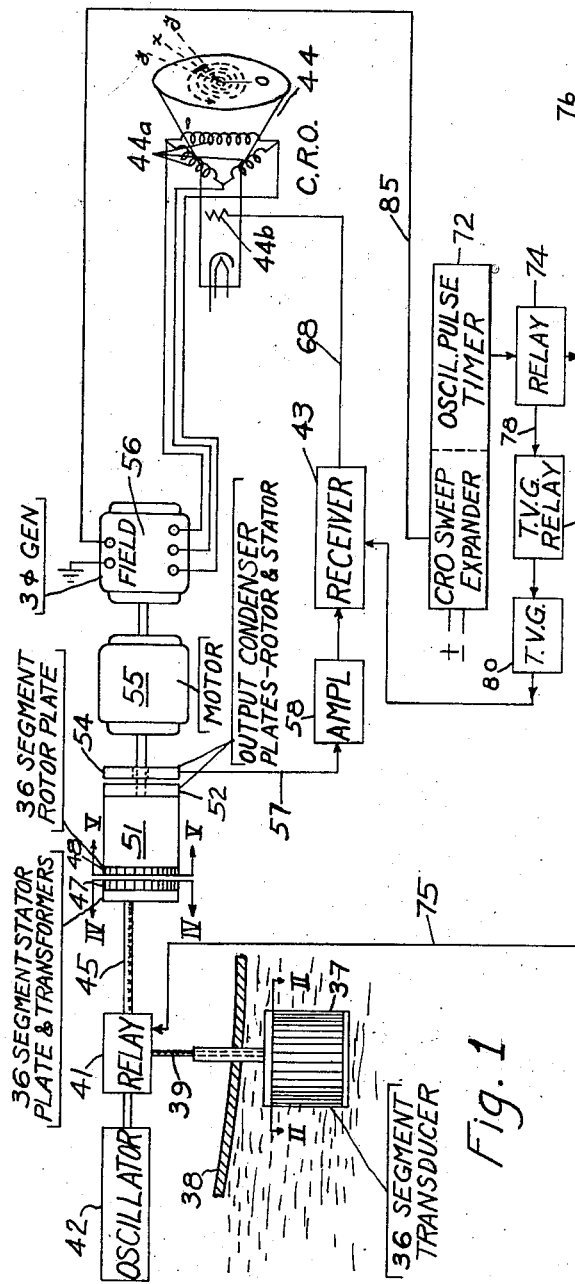
Fig. 1
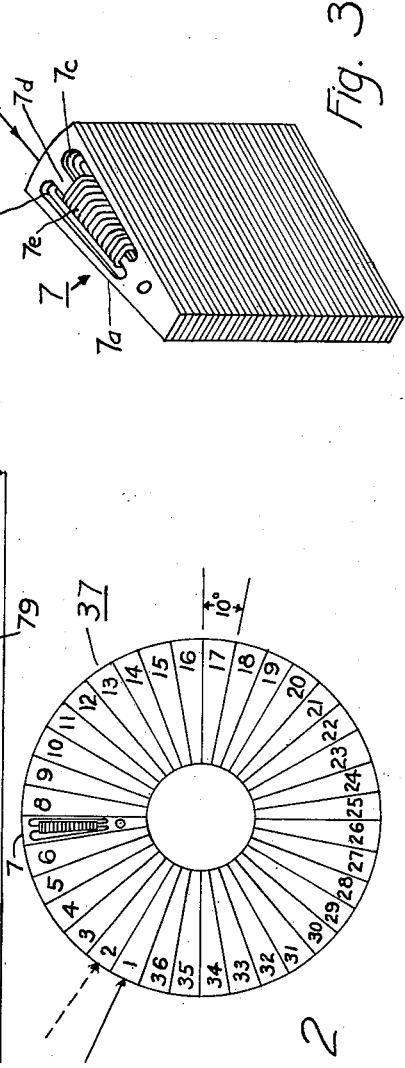
Fig. 2
Fig. 3
INVENTORS
OSCAR H. SCHUCK
LEON G. S. WOOD
BY
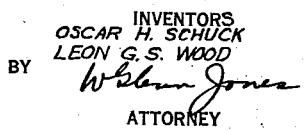
ATTORNEY Dec. 21, 1954   O. H. SCHUCK ET AL   2,697,822
SOUND DETECTING AND INDICATING SYSTEM
Filed Aug. 14, 1944   3 Sheets-Sheet 2

INVENTORS
OSCAR H. SCHUCK
LEON G. S. WOOD
BY
ATTORNEY

INVENTORS
OSCAR H. SCHUCK
LEON G.S. WOOD
BY
ATTORNEY

United States Patent Office 2,697,822
Patented Dec. 21, 1954

2,697,822

SOUND DETECTING AND INDICATING SYSTEM

Oscar Hugo Schuck, Belmont, and Leon G. S. Wood, Wollaston, Mass., assignors to the United States of America as represented by the Secretary of the Navy Application August 14, 1944, Serial No. 549,460

10 Claims. (Cl. 340—3)

This invention relates to apparatus for determining the bearing and range of a source of radiated energy and is particularly directed to the determination of the bearing and range of a source of compressional wave energy arising either directly or as an echo of a transmitted energy pulse.

The invention is of special utility in underwater sound echo ranging and is described in this connection in the following specification. However, it should be understood that it is equally applicable in conjunction with other forms of wave energy direction and range finding or indicating systems.

The general object of the invention is to provide a device which will quickly and accurately determine the bearing and range of a source of radiated wave energy with respect to a point of observation.

A brief discussion of the prior art will be conducive to a complete understanding of this invention and the many advantages and new results made possible by it.

In the prior art underwater compressional wave or sound echo ranging systems, intermittent pulses or pings of compressional wave energy are projected from a transducer, usually of the type having magnetostrictive or piezoelectric elements, carried underwater by a searching vessel.

The design characteristics of the transducer are such that the energy is projected therefrom in a relatively narrow, conical beam, the axis of the beam usually being substantially horizontal. The energy is usually at supersonic frequency although it may be otherwise and is commonly referred to in the art as "sound" even though it be above the normally audible range.

The transducer is mounted for rotation and the operator thus searches around the entire underwater horizon in steps for targets. At each step, the operator sends out a pulse and then waits for a certain length of time to see whether or not any echo is heard. If no echo is heard, the transducer is turned slightly and the process repeated.

When an energy pulse strikes an underwater target such as a submarine, it is reflected or echoed back to the transducer, the latter now being connected to act as an energy receiver. The energy pulse impinging upon the elements of the transducer generates electromotive forces therein and these latter are used to give audible and/or visual indications to the operator. The operator by noting the bearing toward which the transducer is trained when an echo is received will know that a target lies somewhere along such bearing.

The speed of supersonic wave energy in water is substantially constant at about 1600 yards per second. Thus the range of a target may be computed from the time required by the energy pulse to travel from the transducer to the target and back again.

The type of transducer construction currently used for underwater work is directionally sensitive but the main lobe of its sensitivity or directivity pattern is nevertheless relatively flat in the area of maximum sensitivity. Because of this, the operator, when an echo comes in, trains the transducer from side to side on successive pings until he loses the echo on one side and then on the other. Noting the cut-off bearing on each side of the target, the correct bearing is of course the mean between the two. Usually about five or six pings are required for one bearing determination.

The pings may be timed for any particular range such as for example 2000 yards; that is, so as to permit the echo of a ping to return from a target within a 2000 yard range before the next ping is sent out. Thus, if the operator searches around the entire underwater horizon at a 2000 yard range, 6° at a trial, sixty pings are required. If three seconds are allowed for training, pinging and listening, such a search would require three minutes. At a 5000 yard range, six or seven minutes would be required.

A conspicuous shortcoming of the search procedure described above is that only a very small part of the region within acoustical range of the searching vessel is covered at any one time. The need for continual change of transducer bearing calls for considerable skill and effort on the part of the operator. If any sound is heard which might be an echo, time is required to ping several times in that particular direction and this results in incomplete coverage of other portions of the area which should be within reach. After contact is obtained, the skill of the operator is put to further test in maintaining contact, and, if cut-on procedure is used, both range and bearing data are obtained at intervals which are disproportionately long compared to the brief time available for attack.

In contrast to the time consuming search procedure described above, and as an improvement thereon, there is disclosed in the co-pending application of O. Hugo Schuck, Serial No. 536,172, filed May 18, 1944, an echo ranging system in which pulses of acoustic energy of predetermined duration are emitted intermittently from a transducer, the output characteristics of which are such that the acoustic wave is emitted with substantially equal intensity in all directions in a horizontal plane. Echoes of the wave from a target are received by a directionally sensitive transducer which is caused to rotate mechanically at a rate determined by the duration of the emitted pulse.

The period required for one revolution of the receiving transducer determines the duration period of the pulse, the latter being at least equal to the former, so that the receiving transducer will be able to scan the entire underwater horizon during the period that the returning pulse echo is passing through the position of this transducer. Thus if the receiving transducer rotates at 4 R. P. S. the duration period of the transmitted pulse must be at least ¼ second.

Accordingly, at some time in the duration period of the returning echo, the directivity pattern of the receiving transducer will be pointed in the direction from which the echo is coming. A cathode ray oscilloscope tube with a spiral beam sweep synchronized with the rotating receiver is utilized in the system and connections to the tube elements are such that the spirally sweeping beam spot will brighten when an echo is received. Thus the bearing of the beam spot when it brightens relative to the center of the tube screen is always the same as the bearing of the receiver directivity pattern at which the echo pulse is received. The distance of the brightened spot from the center may be calibrated in terms of target range since a spiral sweep begins with each energy pulse transmitted and increases in size uniformly with time after emission of the pulse. The beam spot therefore brightens at a point or points corresponding to the range and bearing of each underwater object from which an echo is reflected. A long persistance screen is used to allow easy observation of all the bright spots and so the operator is furnished a continuous pictorial pattern of all targets in the underwater field.

While the mechanically rotated receiver represented a considerable advance in the art since it scanned the entire underwater horizon in somewhat less than a second as compared to minutes required under the old systems, it does have certain disadvantages. A mechanically rotated receiver requires considerable rigging and creates noise because of its rotation. Further from an operating viewpoint, the relatively long pulse length required, because of the limitation in rotation rate of the receiving transducer, produces a considerable amount of reverberation which may make it somewhat difficult to clearly distinguish pulse echoes coming from targets at relatively short ranges.

A primary object of this invention is therefore to provide an echo ranging system which is an improvement over that described in the aforesaid co-pending application in that the duration of the transmitted pulse may be reduced considerably and the receiver made stationary.

A more specific object is to provide a scanning echo ranging system of the class described having a stationary receiver comprising a circularly arranged array of wave energy receiving elements. The phase and amplitude of the energy received by a particular group of such elements is so controlled that the transducer becomes directionally sensitive with the axis of maximum sensitivity perpendicular to the center element of the group. This axis is then steered around the horizon at a relatively high speed to intercept pulse echoes by means of a rotating phase changer which is connected to the receiver elements through a commutator. The commutator is preferably of the capacitor or magnetic type so that no actual contact between stationary and rotating elements is required.

These and other objects of the invention will become more apparent from the detailed description which now follows and from the accompanying drawings.

In the drawings, in which like parts are identified by like reference numerals,

Fig. 1 is a diagrammatic illustration of a preferred embodiment of the invention;

Fig. 2 is an enlarged plan view of the 36 segment transducer used in the system and taken on lines II—II of Fig. 1;

Fig. 3 is a still further enlarged perspective of one of the transducer segments;

Figure 4:
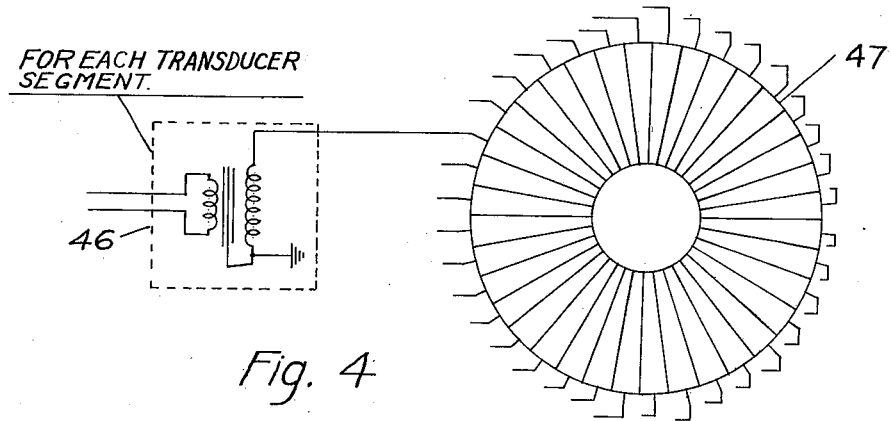
Fig. 4 is an enlarged end view of a stator plate at lines IV—IV of Fig. 1 together with a schematic of a transformer, one of which is associated with each transducer segment.

Referring now to the drawings, a transducer 37 for sending out pulses of compressional wave energy preferably of supersonic frequency, is shown projecting down into the water through a ship's hull 38. This transducer, which is also used for receiving pulse echoes, contains a plurality of like elements or segments, in the present instance thirty-six in number, and identified accordingly by reference numerals 1–36 in Fig. 2. For purposes of simplification in drawing, only one of them, element 7, is shown in detail in Fig. 2 and in an enlarged perspective in Fig. 3. It is understood, however, that all other segments are of the same construction.

As shown clearly in Fig. 3, the transducer segment 7 may consist of a 12" high stack of laminations 7a of magnetostrictive material such as nickel secured together by suitable clamping means, not shown. The laminations, having a thickness of the order of .005" to .010", contain a pair of like cut-outs 7b and 7c so that when stacked, a central core 7d is formed, around which the energizing coil 7e is wound.

As is well known, when coil 7e is supplied with high frequency current, the alternating changes in the magnetic field thereby produced causes the transducer segment 7 to expand and contract at this same frequency along the direction of the arrow in Fig. 3 to send out compressional wave energy into the surrounding medium. Conversely, when segment 7 is made to expand and contract by incoming wave energy, electromotive forces are generated in the coil 7e.

The two ends of each coil 7e of the thirty-six segments are led out of the transducer 37 in a thirty-six pair conductor cable 39 into a relay 41. Relay 41, the control of which will be explained hereinafter in more detail, connects the transducer segments alternately to an oscillator 42 for transmitting an energy pulse and then to a receiver 43 and cathode ray oscilloscope 44 for visually indicating reception of a pulse echo from a target.

Relay 41 and oscillator 42 are of conventional construction and hence have been shown only in block form.

Between relay 41 and receiver 43 are components of the apparatus which function to create the rotating sensitivity lobe in the transducer segments to which reference has previously been made.

Referring now to Figs. 1 and 4, each of the thirty-six conductor pairs are grouped in a cable 45 leading from relay 41 and fed into the primary of an impedance matching transformer 46, only one of which is illustrated in Fig. 4. One side of the secondary of each of the transformers 46 may be made common through ground. The other side of each transformer secondary is connected to one segment of a thirty-six segment plate or stator 47. All the segments of plate 47 are electrically insulated from each other and form the stator of a capacitor type commutator or rotary switching device. The circuit arrangement is such that the thirty-six coils 7e are connected to the segments in the stator 47 in the same order as they appear in the circular array of segments in transducer 37.

Figure 5:
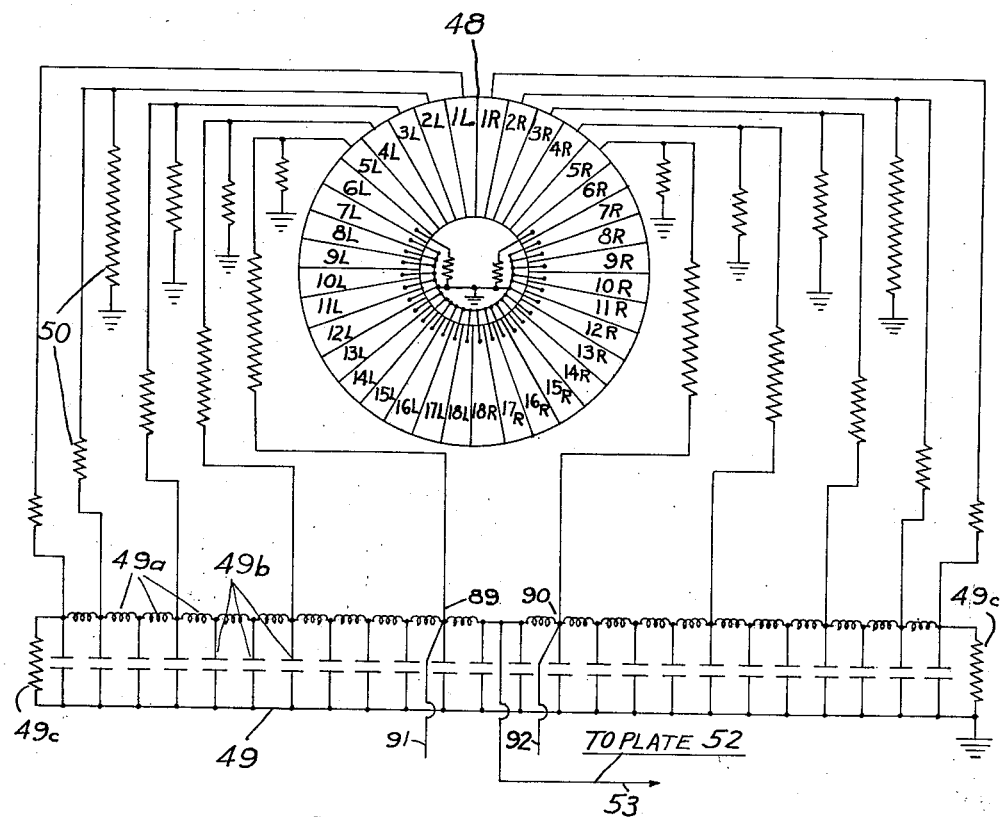
Fig. 5 is an enlarged end view of the rotor plate at lines V—V of Fig. 1 together with a schematic of the phase shifting network connected thereto.

Referring now to Figs. 1 and 5, the rotor member of the capacitor commutator, indicated by reference numeral 48, comprises a like arrangement of thirty-six, electrically separated segments. For convenience, the eighteen segments in the left half are numbered 1L, 2L . . . 18L; those in the right half are similarly numbered 1R, 2R . . . 18R.

It will be seen from Fig. 5 that all but a limited number of the rotor segments, in the present instance ten, are grounded. The remaining active segments 1L through 5L and 1R through 5R are connected in succession to successive points in a lag line 49 through series and parallel connected impedances 50. Lag line 49 comprises series connected inductances 49a, parallel connected capacitances 49b and terminal impedances 49c. The specific components of the lag line and impedances are computed to fit the physical dimensions of a particular transducer and will of course vary with different transducers.

As shown in Fig. 1, the lag line components are contained within a cylinder 51 of which one end plate is the rotor 48. The opposite end plate may comprise an annular capacitor plate 52, which connects via conductor 53 (see Fig. 5) to the center of lag line 49. Another annular capacitor plate 54, which is stationary, co-acts with rotating plate 52 to form a "take-off" in lieu of the conventional slip ring arrangement.

Cylinder 51 and its end plates 48 and 52 are rotated at a relatively high speed, for example 30 R. P. S. by motor 55.

Referring to Fig. 2, the function of the capacitor commutator consisting of juxtaposed plates 47 and 48 now becomes clear. If a sound wave such as a pulse echo approaches transducer 37 in the direction indicated by the solid arrow it will arrive first at segment 1, next at 2 and 36, and then progressively later at succeeding pairs of transducer segments. If the signal from segment 1 is delayed or changed in phase, a smaller delay or phase change introduced into the signals from segments 2 and 36, a still smaller delay into the signals from segments 3 and 35, etc., the several signals can be made to agree in phase and can therefore be added and amplified as one signal. If the angle of approach of the sound wave is different, the individual signals will largely neutralize each other because of improper phase change for the new direction. It will thus be seen that in its receiving function, the array of transducer segments connected with various degrees of delay as described is made directionally sensitive, it being most sensitive along a perpendicular to the transducer segment at any instant having the greatest amount of phase displacement. It is progressively less sensitive on either side of this perpendicular so that the sensitivity pattern becomes a sharp and narrow lobe, with its axis along the aforesaid perpendicular.

Now if each connection is moved clockwise to the next adjacent element so that the greatest delay is introduced in the signal from transducer segment 2, less into the signals from 1 and 3, still less into the signals from 36 and 4, etc., the axis of the sensitivity lobe acquires a new direction indicated by the broken arrow in Fig. 2. Thus since transducer 37 has thirty-six segments, the axis of the sensitivity lobe is changed in direction by 1/36 of the underwater horizon or 10° at a time.

By rotating plate 48, the segments of which are connected in circuit with lag line 49 as described, these desired consecutive changes in connections are made and the sensitivity lobe rotates smoothly and continuously at 30 R. P. S. or at whatever other speed the motor 55 is run.

Also rotated by motor 55 is a 3 phase generator 56 whose output is connected to three symmetrically placed windings 44a on oscilloscope 44 to effect rotation of its beam on the oscilloscope screen. By periodically varying the amplitude of the output from generator 56 linearly with time and synchronizing these periodic variations with pulse transmission, the beam spot is made to periodically expand outwardly from the screen center in a spiral. This feature will be discussed in further detail in a later part of the specification.

In setting up the apparatus, the elements of transducer 37, and their connections to stator plate 47 should be so oriented with respect to rotor plate 48 and the three phase sweep output potential from generator 56 that the bearing of a pulse echo relative to the stationary transducer 37 will be indicated at a like bearing on the screen of the oscilloscope. The screen center represents the position of transducer 37 on the attacking vessel and the top of the screen may be made to represent the bow of the vessel so that all bearing indication on the screen will be relative to the lubber line of the vessel.

From stator plate 54, the echo signal is taken via conductor 57 through a pre-amplifier 58 shown in block form only because it is conventional.

Figure 6:
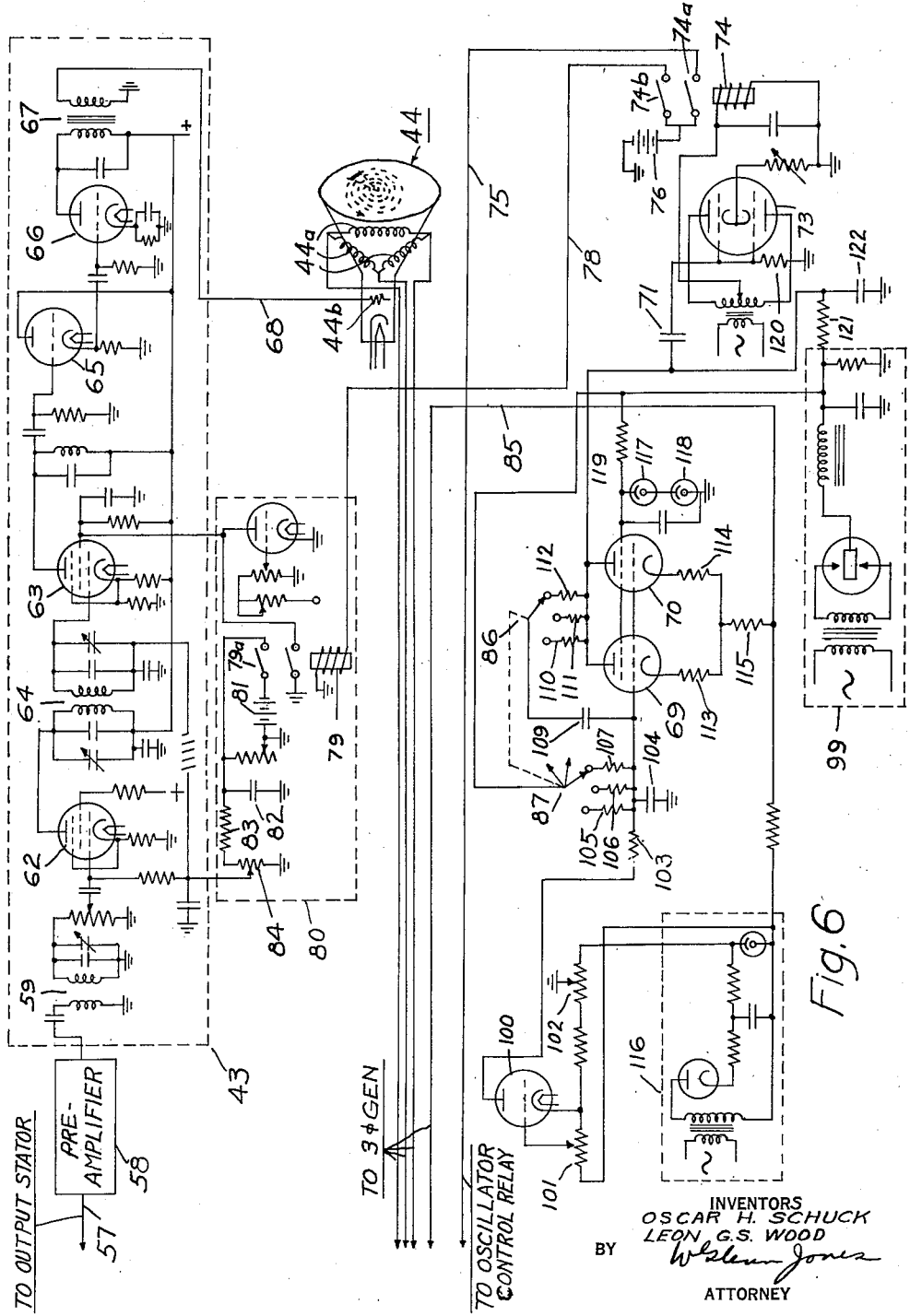
Fig. 6 is a schematic diagram of certain components of the system.

Referring now to Fig. 6, the output from amplifier 58 feeds into the receiver 43, already mentioned, and indicated by this reference numeral in Fig. 6. Briefly, this receiver comprises a tuned transformer coupling 59, followed by two stages of amplification in tubes 62, 63 which may be of the 6SG7 type with a band pass filter 64 therebetween. The output of tube 63 feeds the input grid of tube 65 which may be a 6J5. The cathode of tube 65 is coupled to the input grid of a second 6J5 (tube 66) and the output of this latter tube feeds the primary of an output transformer 67. Conductor 68 connects the secondary of this transformer to the brightening grid 44b of oscilloscope 44.

Intermittent operation of oscillator 42, whereby transducer 37 is caused to send out energy pulses of a duration period at least equal to the period required for the capacitor commutator to make one revolution, in the present case 1/30 sec., is obtained from the component parts generally identified by reference numeral 72 in Fig. 1 and shown in detail in Fig. 6. With particular reference to Fig. 6, a gas discharge tube 100, which may be a 2051 "thyratron," is used to determine the interval between the transmitting pulses. Its anode circuit is fed from power supply 99 through resistors 105, 106 or 107, and resistor 103. Capacitor 104, in conjunction with the selected one of the resistors 105, 106, 107 as selected by switch 87, determines the interval. Fine adjustment of this interval is made by means of variable resistor 101 in the grid circuit. A sawtooth wave is thus generated by the gas discharge tube 100 in a manner well known in the art and this voltage wave is applied to the grids of power tubes 69, 70 which may be type 6L6. These tubes have their anodes, screens, and grids tied together; their cathodes are isolated to prevent parasitic oscillation by resistors 113, 114 but otherwise have a common cathode resistor 115 and return to ground through a negative power supply 116 and adjustable resistor 102.

The screens are parallel and are maintained at a constant potential with respect to ground by the action of the voltage rectifier tubes 117, 118, the positive current supply being supplied through resistor 119 and rectifier 99.

The cathode current of tubes 69 and 70 also returns to ground through lead 85 and the field of the three phase generator 56 shown in Fig. 1. It is necessary, in order that the spiral sweep trace on tube 44 always start at the center of the tube, that the current through the field of generator 56 be zero at the beginning of the sweep. This is made possible by adjustment of the adjustable resistor 102.

Since it is desirable that the sweep be perfectly linear, and since the vacuum tubes 69 and 70 have curved characteristics, a feedback circuit is used to achieve the necessary linearity. This feedback circuit operates in a well known manner and consists of capacitor 109 and resistors 110, 111 or 112, as determined by the setting of switch 86 which is mechanically ganged with the pulse interval selection switch 87.

The anode supply for tubes 69 and 70 is obtained from power supply 99 through resistor 121 and filter capacitor 122. The rapid flyback in the sawtooth plate current wave form is differentiated through the action of capacitor 71 and resistor 120 and applied to the paralleled grids of the double triode 73. This tube acts as a full wave rectifier during the time when the grids are in the region above cut-off when the pulse is applied to their grids. Therefore, plate current is drawn through relay 74 and the circuits 74a and 74b are closed. Circuit 74a, through lead 75, controls oscillator control relay 41 shown in Fig. 1. Circuit 74b permits operation of relay 79 in the TVG circuit 80.

As seen from Fig. 1, and previously explained, energization of relay 41 connects the oscillator 42 to transducer 37.

Relay 79, which is energized simultaneously with relay 41, functions to impress a time varied gain (T. V. G.) identified by reference numeral 80, on amplifier tube 62 of receiver 43 so that the intense reverberation immediately following the termination of a transmitted pulse will be suppressed. This is desirable to protect the oscilloscope 44 as the signal level of the reverberation is usually quite high, and further to permit a more distinct indication of the pulse echo from a target on the oscilloscope screen.

In particular, closure of relay contacts 79a completes a charging circuit from battery 81 to condenser 82 and the negative potential on this condenser is impressed across the control grid of amplifier tube 62. This potential is sufficient to substantially block tube 62. However, when relay contacts 79a open upon deenergization of relay 79, which occurs at the end of an energy pulse from transducer 37, condenser 82 will discharge gradually through fixed resistor 83 and variable resistor 84 thereby gradually reducing its potential and hence restoring the gain of tube 62. Thus nearby reverberation is practically blocked out but by the time a pulse echo from a true target comes in, the gain of tube 62 has been restored to its normal value.

As previously discussed in an earlier part of this specification, a new spiral sweep for the electron beam of oscilloscope 44 is initiated with each pulse transmission so that the range of the target from the source of the pulses may be determined. This is accomplished by periodically increasing the field current in the sweep generator 56 uniformly with time from substantially a zero value at pulse transmission. Increase of field current increases the 3 phase output potential impressed across the oscilloscope beam deflecting coils 44a and hence causes the beam to sweep the screen in an expanding spiral.

The increasing potential for the field of generator 56 is fed over conductor 85, and its duration period, at the end of which flyback of the beam occurs, is controlled by commonly operated range selector switches 86 and 87. These switches also control the pulse repetition rate since it is evident that the energy pulses emitted from transducer 37 must be so spaced that a pulse will not be repeated while the oscilloscope beam is still sweeping the range selected for the immediately preceding pulse. In other words, flyback of the beam sweep associated with one pulse must occur before the next pulse is sent out.

Thus with a known speed of compressional wave energy through water of approximately 1600 yards per sec. and allowing one-half of the time interval between successive periods of pulse transmission by transducer 37 as the maximum time over which any echo may be received before the next pulse is sent out, it will be seen, for example, that a range of 4000 yards will be obtained by spacing successive energy pulses at five second intervals. Thus in the present apparatus, with a pulse interval of five seconds, the electron beam of oscilloscope 44 will expand spirally with each transmission of a pulse for a period of approximately five seconds at which time flyback will occur and the expanding spiral repeated with the transmission of the next energy pulse.

*Operation*

The apparatus described functions in the following manner: Depending upon the particular setting of range switches 86 and 87, relay 74 is energized at intervals for periods of about 1/30 second each, it being assumed that motor 55 is run at 30 R. P. S. Each time that relay 74 is energized, it effects energization of relay 41 for the same time period which causes compressional wave energy to be emitted from transducer 37 for a period of 1/30 of a second. As previously described, all segments of the transducer 37 are connected in parallel during energy transmission with the result that the pattern, in plan, of the compressional wave energy emitted from the transducer is an annulus having a width equal to the distance that the energy travels through the water in 1/30 sec. and of steadily increasing diameter.

Relay 79 is also energized simultaneously with relay 74 and operation of the former places a negative blocking potential upon the input grid of amplifier 62 which thereby serves to block out the immediately following reverberation from the screen of the oscilloscope 44.

When relay 74 opens, relays 41 and 79 are also opened. Contacts on relay 41 then connect the transducer segments to corresponding elements on the stator plate 47 to thereby condition the apparatus for intercepting any echo which may be reflected from one or more targets around the underwater horizon. As the commutator plate 48 rotates, one after another of the transducer segments is, in effect, placed in the center of the lag line 49, as previously described with the result that the sensitivity lobe of the transducer rotates synchronously with plate 48.

As previously explained, since the pulse period is approximately 1/30 sec., any echo of the pulse will also be passing the transducer for the same period. As the sensitivity lobe of the transducer also completes one revolution each 1/30 sec., it is apparent that at some time in the duration period of any returning echo of the pulse transmitted, the sensitivity lobe of transducer 37 will be pointed in the direction from which the echo is coming.

Any such echo received by the transducer 37 thus produces at the output of lag line 49 a corresponding signal which is taken off stator plate 54, fed thru the preamplifier 58 and receiver 43 and thence onto the brightening grid 44b of oscilloscope 44.

In the meantime, amplifier 62 has been gradually unblocked by the discharge of condenser 82 which takes place upon the opening of relay 79 so that by the time the pulse echo has been fed into the receiver 43, the gain of amplifier tube 62 has been restored to a suitable value thereby allowing the pulse echo to be properly amplified for satisfactory indication on the CRO.

Also, at the time relay 74 opens, a potential increasing linearly with time is fed over conductor 85 to the field circuit of the sweep generator 56 which causes the electron beam of the oscilloscope 44 to expand linearly with time in the form of a spiral following transmission of the pulse.

Thus as the echo pulse signal is fed onto the brightening grid 44b of the oscilloscope 44, it will cause the spirally sweeping beam to brighten over a relatively narrow arc y—y on the oscilloscope screen as shown in Fig. 1.

Since the spiral sweep is synchronized with rotation of the sensitivity lobe of the transducer, the bearing of the center point of the arc over which the beam spot brightens on the oscilloscope screen relative to the screen center or Ox will be the bearing at which the pulse echo struck transducer 37.

The range will of course be proportional to the length of vector Ox and the face of the oscilloscope screen may be calibrated to read directly in terms of yards if so desired.

If there is more than one target from which pulse echoes return to transducer 37, each of them will appear on the oscilloscope screen and so the operator is continually supplied with a complete picture of the target situation throughout the entire underwater field.

As an alternative arrangement, instead of tapping the lag line 49 at the center and taking the signal out via conductor 53, the lag line may be tapped on either side of the center at points 89 and 90. By doing this, the effect is to divide the transducer array into two symmetrical halves, each of which is suitably lagged to give a composite signal directionally spaced from the other. The effect is to produce two overlapped beams or lobes of sensitivity which pass successively across an echo wave front. The two signal outputs from lag line 49 may feed via conductors 91, 92 out of the rotating cylinder 51 by any suitable take off means such as the conventional slip ring arrangement. Or, if desired, capacitor plates similar to stator and rotor plates 52 and 54 but differing therefrom by having a pair of concentric annular plates instead of the single plate arrangement as shown in the present embodiment may be used. The two signal outputs are then injected into the input grids respectively of mixers 28 and 29 shown and described in copending application Serial No. 546,842, filed July 27, 1944, now Patent No. 2,666,192. This latter arrangement sharpens the bearing indication.

While the invention has been described in conjunction with a commutator of the capacity type and this form is preferred, it may also be successfully carried out by utilizing scanning coils and transferring the received energy inductively. In either form the commutation is smooth and continuous and free from the sudden shifts which would attend the use of a brush and segmented plate type of commutator.

In conclusion, we wish it to be understood that various changes may be made in the present embodiment without departing from the spirit and scope of the invention as described and defined in the appended claims.

What is claimed is:

1. A transducer for receiving acoustic energy signals comprising a plurality of transducer elements disposed in an arcuate array, means connecting predetermined amounts of phase shifting means in circuit with each transducer element in a selected group of said elements to bring the signals received by each transducer element in said group into a common phase relationship, and circuit means combining the signals received by all transducer elements in said group into a unit signal.

2. A transducer for receiving acoustic energy signals comprising a plurality of transducer elements disposed in an arcuate array, means connecting predetermined amounts of phase shift in circuit with each transducer element in a particular group of said elements, the center element in said group having the greatest amount of phase shift with succeeding pairs of transducer elements in said group having lesser amounts of phase shift to bring the signals received by each transducer element in said group into a common phase relationship to thereby render said array most sensitive along an axis perpendicular to the center element in said group, and circuit means combining all signals received by said group of transducer elements into a unit signal.

3. A transducer for receiving acoustic wave energy comprising a plurality of transducer elements disposed in an arcuate array, means connecting predetermined amounts of phase shift in circuit with each of a particular group of said transducer elements, the center element in said group having the greatest amount of phase shift with succeeding pairs of transducer elements in said group having lesser amounts of phase shift to bring the signals received by each transducer element in said group into a common phase relationship, circuit means combining all signals received by said group of elements into a unit signal and means for moving said connecting means over said transducer array whereby successive elements thereof become the center element of said group.

4. Apparatus for determining the bearing of a source of acoustic energy signals in a field comprising a circular array of transducer elements, a segmented stator plate having successive segments thereof connected to successive transducer elements, a segmented rotating plate capacitively coupled to said stator plate but with said coupling extending only over a selected group of segments on said stator plate at any instant, means connecting predetermined amounts of phase shift in circuit with each element in any of said groups through said stator and rotor plates, the center element of any said group having the greatest amount of phase shift with succeeding pairs of transducer elements in the group having lesser amounts of phase shift to bring the signals received by each element in the group into a common phase relationship, circuit means then combining all signals received by the group into a unit signal, a representation of said field, indicator means connected to last said means for producing an indication on said field representation when a signal is received and means for sweeping said indicator means around said field representation in synchronism with rotation of said rotating plate.

5. Apparatus for determining the bearing of a source of acoustic energy signals in a field comprising a circular array of transducer elements, rotary switching means spanning a group of said elements, means connecting predetermined amounts of phase shift in circuit with each element in said group through said switching means, the center element in any said group having the greatest amount of phase shift with succeeding pairs of transducer elements in the group receiving lesser amounts of phase shift to bring the signals received by each transducer element in the group into a common phase relationship, circuit means then combining all signals received by the group into a unit signal, a representation of said field, indicator means connected to last said means for producing an indication on said field representation when a signal is received, and means for sweeping said indicator means around said field representation in synchronism with rotation of said rotary switching means.

6. Apparatus for determining the bearing and range of a target in a given field comprising means for emitting acoustic wave energy uniformly into said field for a predetermined period, said wave energy being of substantially uniform intensity in a horizontal plane, means for receiving an echo of said energy from said target comprising a circular array of transducer elements, rotary switching means spanning a group of said elements, means connecting predetermined amounts of phase shift in circuit with each element in said group through said switching means, the center element in any said group having the greatest amount of phase shift with succeeding pairs of transducer elements in the group receiving lesser amounts of phase shift to bring the signals received by each transducer element in the group into a common phase relationship, circuit means then combining all signals received by the group into a unit signal, a representation of said field, indicator means connected to said last means for producing an indication on said field representation when a signal is received, and means for spirally sweeping said indicator means around said field representation, repetition of said sweep being synchronized with operation of said energy emitting means and the turns thereof being synchronized with operation of said rotary switching means.

7. Apparatus for determining the bearing and range of a target in a given field comprising a circular array of transducer elements, means for energizing all of said elements simultaneously for a predetermined period to thereby emit compressional wave energy into said field for said period, said wave energy being of substantially uniform intensity in a horizontal plane, rotary switching means spanning a group of said elements, means connecting predetermined amounts of phase shift in circuit with each element in said group through said switching means, the center element in any said group having the greatest amount of phase shift with succeeding pairs of transducer elements in the group receiving lesser amounts of phase shift to bring any echoes of said emitted energy when received by each transducer element in the group into a common phase relationship, circuit means then combining energy echoes received by the group into a unit signal, a representation of said field, indicator means connected to said last means for producing an indication on said field representation when a signal is received and means for spirally sweeping said indicator means around said field representation, repetition of said sweep being synchronized with emission of said energy and the turns thereof being synchronized with rotation of said rotary switching means.

8. Apparatus for determining the bearing and range of a target in a given field comprising a circular array of transducer elements, means for energizing all of said elements simultaneously for a predetermined period to thereby emit compressional wave energy into said field for said period, said wave energy being of substantially uniform intensity in a horizontal plane, a stator member having a segment connected with and corresponding to each transducer element, a segmented rotor member capacitively coupled to said stator member but with said capacity coupling effective over only a preselected number of stator segments at any one instant, means for rotating said rotor, a phase shifting network connected to said rotor segments for bringing the target echoes of said energy as received in succession by transducer elements corresponding to the particular stator segments then capacitively coupled to the rotor segments into a common phase relationship to thereby impart a directional sensitivity to said transducer, circuit means then combining said echo energy into a single signal, a representation of said field, indicator means connected to said last means for producing an indication on said field representation when an echo signal is received and means for periodically spirally sweeping said indicator means around said field representation, repetition of said sweep being synchronized with emission of said energy and the turns thereof being synchronized with rotation of said rotor.

9. Apparatus for determining the bearing and range of a target in a given field comprising a circular array of transducer elements, means for energizing all transducer elements simultaneously for a predetermined period to thereby emit compressional wave energy for said period, said wave energy being of substantially uniform intensity in a horizontal plane, rotary switching means effective when said transducer is connected for receiving target echoes of said energy for connecting only a preselected span of said elements in the receiver circuit at any one instant, means for imparting predetermined amounts of phase shift to the instant connected transducer elements for bringing any echo energy received separately by these elements into a common phase relationship, means then combining said echo energy into a single echo signal, a representation of said field, indicator means for producing an indication on said field representation when said echo signal is received, and means for periodically spirally sweeping said indicator means around said field representation, repetition of said sweep being synchronized with emission of said energy and the turns thereof being synchronized with rotation of said switching means.

10. Apparatus for determining the bearing of a source of acoustic energy in a field comprising, a circular array of transducer elements, scanning means for said transducer elements including serially arranged stationary means associated with each element, rotary means electrically coupled to said last named means and adapted to receive electrical energy from said stationary means, the rotary means effectively extending over only a selected group of stationary means at any instant, means connecting predetermined amounts of phase shift in circuit with each element of said rotating group, the central element having the greatest amount of phase shift with succeeding pairs of elements having lesser amounts of phase shift to bring the signals received by each element in the group into a common phase relationship, circuit means then combining all signals received by the group into a unit signal, a representation of said field, indicator means connected to said last means for producing an indication on said field representation when a signal is received and means for sweeping said indicator means around said field representation in synchronism with rotation of said rotary means.

No references cited.